Jan. 15, 1929.

A. L. ALAJ 1,699,339

FOOD PROTECTING DEVICE

Filed May 16, 1928

INVENTOR.

*Antoine L. Alaj,*

BY

*Geo. P. Kimmel* ATTORNEYS.

Patented Jan. 15, 1929.

1,699,339

UNITED STATES PATENT OFFICE.

ANTOINE L. ALAJ, OF CHICAGO, ILLINOIS.

FOOD-PROTECTING DEVICE.

Application filed May 16, 1928. Serial No. 278,166.

This invention relates to a protecting device for food, more particularly to an improvement upon the form of protecting device as disclosed by Letters Patent 1,598,409, granted to me August 13, 1926, for enclosing an article of food upon a plate to prevent the dissipation of the heat or moisture thereof when transporting food from the kitchen to the place for serving, under such conditions maintaining the food in its substantially original prepared or cooked condition, and the invention as hereinafter set forth not only embodies the objects and advantages as referred to in the patent aforesaid, but has for its further object to provide, in a manner as hereinafter set forth, a new and novel combined supporting, sealing and cushioning means anchored to the bottom of the body portion of the device in a manner to prevent disconnection therefrom under ordinary conditions.

The food protecting device, in accordance with this invention is so constructed as to enable a series of such devices being arranged in superposed relation with respect to a series of spaced, superposed food carrying plates in a manner as disclosed in the patent aforesaid whereby the plates and devices can be transported, in stacked position, at one time by a waiter for serving a plurality of diners with the food in its substantially originally cooked or prepared condition, under such circumstances an expeditious service is provided whereby a great saving in time is had and delay to the diners is overcome. The device being so constructed that when serving one of the several diners, it is readily removed from the plate with which it is associated and supported upon the arm of a waiter.

Further objects of the invention are to provide, in a manner as hereinafter set forth, a food protecting device which is simple in its construction and arrangement, strong, durable, compact, thoroughly efficient in its use, conveniently mounted with respect to the food carrying plate, and inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
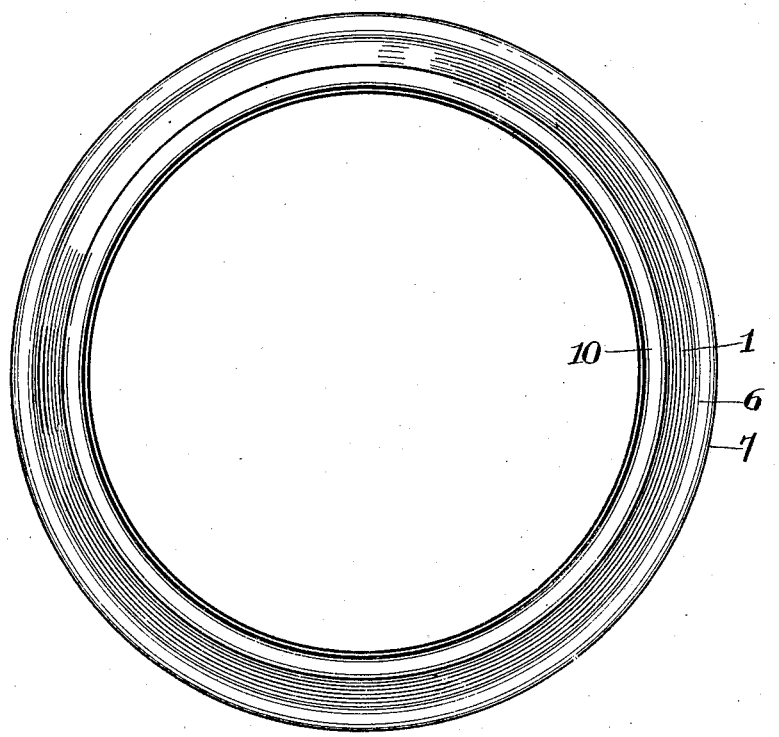
Figure 1 is a top plan view of a food protecting device in accordance with this invention.
Figure 2:
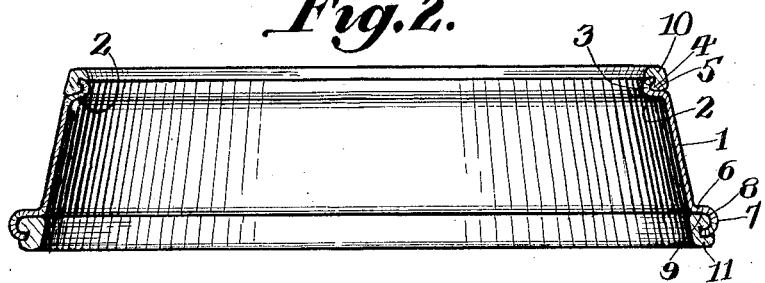
Figure 2 is a cross sectional view thereof.

A food protecting device, in accordance with this invention, comprises a tapered body portion of bandlike form constructed of any suitable material, preferably metallic of any desirable gauge.

The device comprises a body portion 1 which is of annular form and tapered in vertical section. The top of the body portion 1 merges into an inwardly extending, annular flange 2 which is co-extensive therewith and said flange 2 merges into an upstanding, annular projection of semi-circular contour in vertical section which opens outwardly. The projection is indicated at 3 and provides an annular groove 4 which is inset with respect to the body portion 1. The upper face of the flange 2 provides a seat 5.

The lower end of the body portion 1 terminates in an outwardly extending, annular flange 6 which merges into a depending annular extension 7 of semi-circular contour in vertical section and which opens inwardly thereby providing a groove 8 which is oppositely disposed with respect to the groove 4 and is offset further with respect to the latter. The lower face of the flange 6 provides an abutment 9.

Mounted on the seat 5 and extending into the groove 4 and further overlapping the top of the projection 3 is a resilient sealing member 10 which is co-extensive with the flange 2.

Positioned against the abutment 9, extending into the groove 8 and overlapping the lower part of the extension 7 is a combined supporting, sealing and cushioning member 11 formed of resilient material.

The extension 7 is of greater height than the extension 3. In vertical section the member 11 is of greater height than the member 10. The member 11 is arranged within the body portion 1 and the member 10 exteriorly thereof. The inner face of the member 11 forms a continuation of the inner face of the body portion 1 and the outer face of the member 10 forms a continuation of the outer face of the body portion 1. The members 10 and 11 snugly engage the extensions 3 and 7 respectively. The extensions 3 and 7 extend into the members 10 and 11 and the resilient characteristic of said members provides a clamping action with the extensions 3, 7.

When the protecting device is employed, the member 11 is mounted upon the plate provided with the food and the member 10 is to abut against the bottom of a food carrying plate arranged in superposed spaced relation with respect to that plate upon which seats the member 11 and by this arrangement the article of food carried by the lower plate is enclosed and the device acts to prevent the dissipation of heat or moisture when transporting the food from the kitchen to the place of serving, under such conditions the food is substantially in its originally prepared or cooked condition, and under such conditions it is thought the many advantages of a food protecting device, in accordance with this invention, can be readily understood, and although the preferred embodiment of the invention is as illustrated and described, yet it is to be understood that changes in the details of construction can be had which will fall within the scope of the invention as claimed.

What I claim is:

1. A food protecting device comprising a body portion of band like form having an inwardly directed flange at its top and terminating in an upwardly directed projection of curved contour in vertical section and providing a groove opening outwardly, said body portion further having an outwardly directed flange at its bottom terminating in a depending projection of curved contour and providing a groove opening inwardly, and a pair of resilient sealing members, one abutting said top flange, seated in the upper groove and overlapping the top of the upper projection, and the other abutting said lower flange, seated in the lower groove and overlapping the bottom of said lower projection.

2. A food protecting device comprising a body portion of band like form having an inset groove at its top opening at the outer periphery thereof and further having an outset groove at its bottom opening at the inner periphery thereof, a resilient member mounted in said upper groove and overlapping the top of said body, and a resilient member mounted in said lower groove and overlapping the bottom of said body, said upper member positioned exteriorly of and said inner member positioned interiorly of said body.

3. A food protecting device comprising a body portion of band like form having an inset groove at its top opening at the outer periphery thereof and further having an outset groove at its bottom opening at the inner periphery thereof, a resilient member mounted in said upper groove and overlapping the top of said body, a resilient member mounted in said lower groove and overlapping the bottom of said body, said upper member positioned exteriorly of and said inner member positioned interiorly of said body, and said lower member being of greater height than said upper member.

4. A food protecting device comprising a body portion of band like form having an inset groove at its top opening at the outer periphery thereof and further having an outset groove at its bottom opening at the inner periphery thereof, a resilient member mounted in said upper groove and overlapping the top of said body, a resilient member mounted in said lower groove and overlapping the bottom of said body, said upper member positioned exteriorly of and said inner member positioned interiorly of said body, and said upper member having its outer edge flush with the outer periphery of said body and said lower member having its inner edge flush with the inner periphery of said body.

In testimony whereof, I affix my signature hereto.

ANTOINE L. ALAJ.